March 31, 1959 — S. P. JONES — 2,879,793
PRESSURE REGULATOR
Filed July 5, 1955 — 3 Sheets-Sheet 1

INVENTOR
Sam P. Jones

BY Shley & Shley

ATTORNEYS

INVENTOR
Sam P. Jones

United States Patent Office 2,879,793
Patented Mar. 31, 1959

2,879,793

PRESSURE REGULATOR

Sam P. Jones, Dallas, Tex., assignor to J & S Carburetor Company, Dallas, Tex., a corporation of Texas Application July 5, 1955, Serial No. 519,841

6 Claims. (Cl. 137—494)

This invention relates to new and useful improvements in pressure regulators.

One object of the invention is to provide an improved pressure regulator of compact, economical, simplified construction for use with gas carburetion systems for internal combustion engines wherein butane-propane mixtures and liquefied petroleum gas is employed.

Another object of the invention is to provide an improved pressure regulator which is efficient and durable and which is so constructed that the parts thereof subject to failure may be readily removed and replaced with minimum effort and lapse of time.

An important object of the invention is to provide an improved pressure regulator, of the character described, having spring-pressed valve means and diaphragm means associated therewith in such manner as to reduce frictional resistance and wear to a minimum and facilitate adjustment as well as replacement of the valve means.

A particular object of the invention is to provide an improved pressure regulator having a pair of coacting diaphragms which are mounted in opposed relation so as to balance each other and equalize the lateral thrust exerted upon the valve means of the regulator.

A further object of the invention is to provide an improved pressure regulator, of the character described, wherein the diaphragms are of inexpensive construction so as to be disposable and are detachably connected to the body of the regulator so as to be readily replaceable, and wherein said diaphragms have connection with the valve means by novel means.

A construction designed to carry out the invention will be hereinafter described together with other features of the invention.

Figure 1:
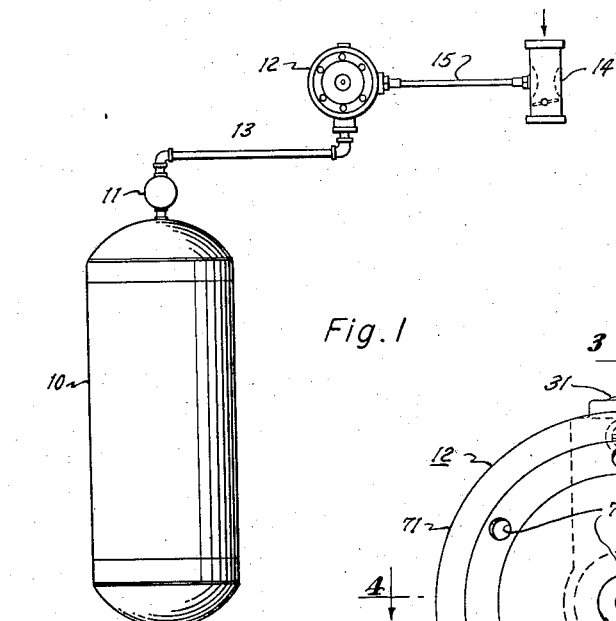
Figure 2:
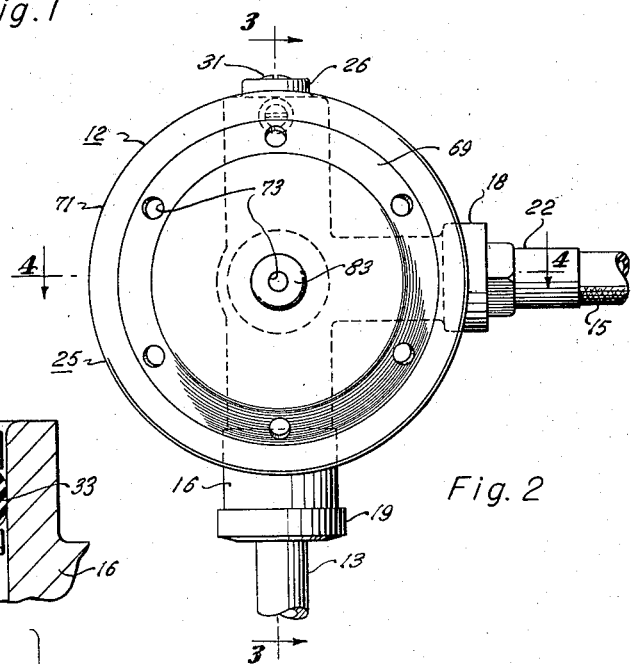
Figure 5:
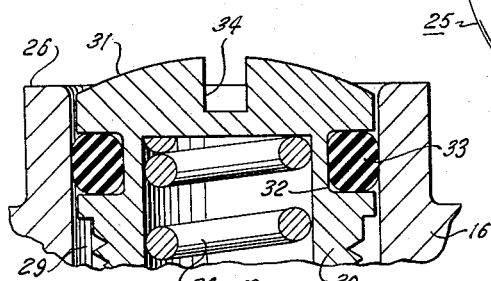
Figure 6:
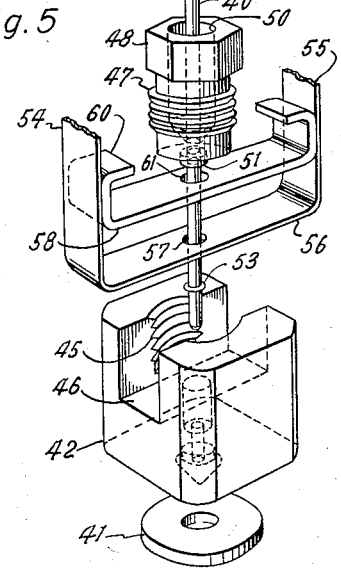
Figure 7:
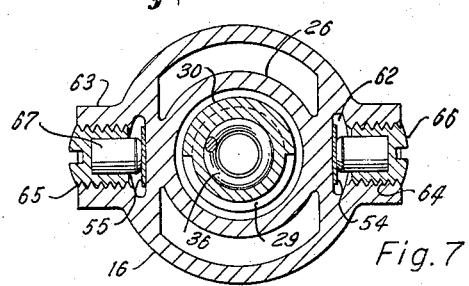
Figure 3:
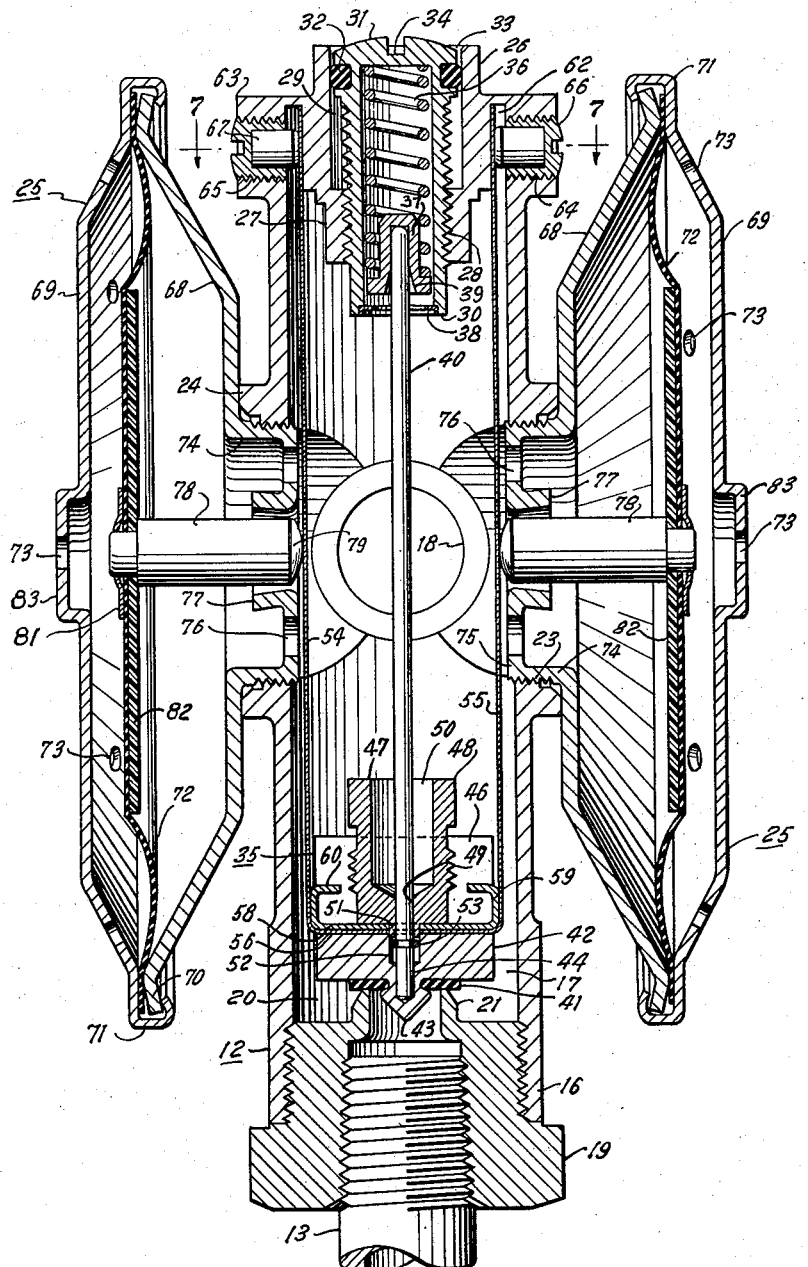
Figure 4:
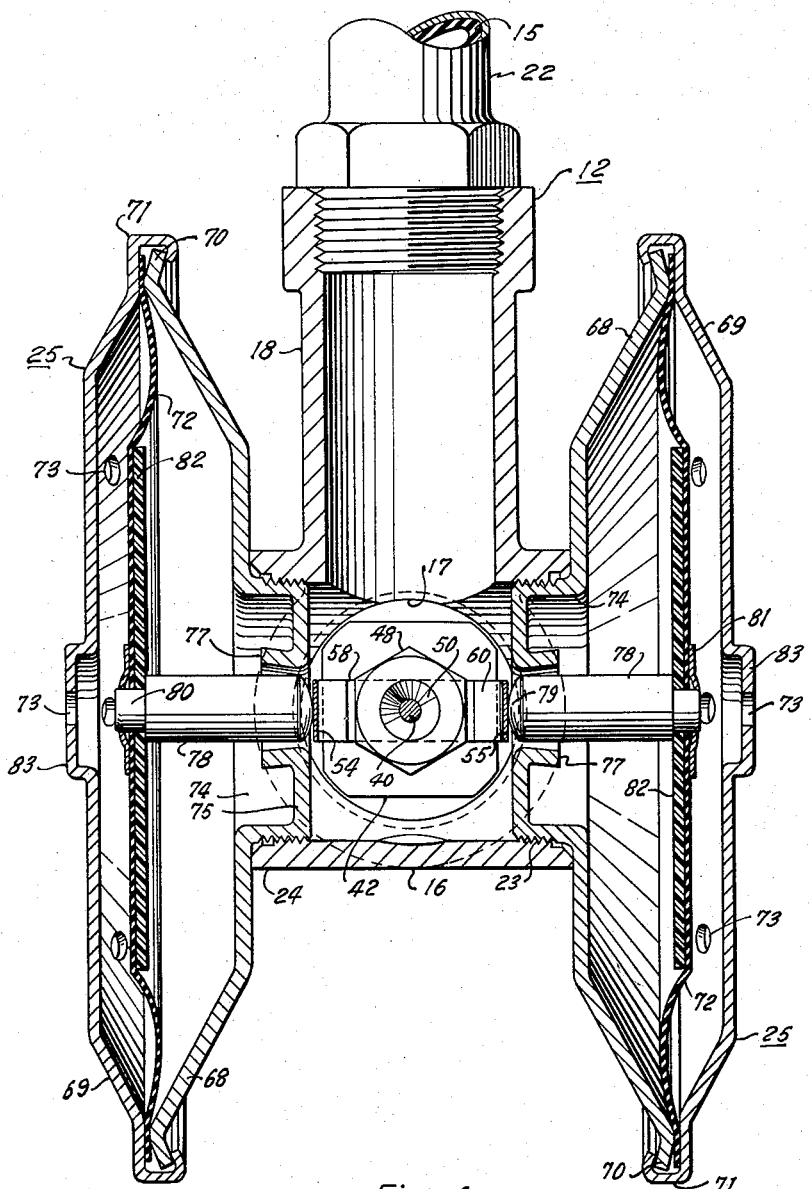

The invention will be more readily understood from a reading of the following specification and by reference to the accompanying drawings, wherein an example of the invention is shown, and wherein:

Fig. 1 is a plan view of gas carburetion system including a pressure regulator constructed in accordance with the invention, Fig. 2 is a plan view of the pressure regulator, Fig. 3 is an enlarged, transverse, vertical, sectional view, taken on the line 3—3 of Fig. 2, Fig. 4 is an enlarged, transverse, vertical, sectional view, taken on the line 4—4 of Fig. 2 and at a right angle to Fig. 3, Fig. 5 is an enlarged, sectional view showing the mounting of one end of the valve means and its spring, Fig. 6 is an exploded, perspective view of a portion of the opposite end of the valve means, and Fig. 7 is a cross-sectional view, taken on the line 7—7 of Fig. 3.

In the drawings, the numeral 10 designates a storage tank for supplying liquefied petroleum gas, such as butane-propane mixtures, to a gas carburetion system for an internal combustion engine (not shown). A typical gas carburetion system may include a high pressure regulator and vaporizer 11 connected to the tank, a low pressure regulator 12 for receiving low pressure gas from the regulator-vaporizer 11 through a suitable conductor 13 and a carburetor 14 connected to the regulator 12 by a suitable conductor 15. The low pressure regulator, which forms the subject matter of the present invention, includes a T-shaped, tubular body or housing 16 having a longitudinal, cylindrical bore or chamber 17 and an intermediate, lateral extension or outlet 18 communicating with the bore (Figs. 2–4). A flanged bushing 19 is screw-threaded in one end of the chamber 17 for connecting the conductor 13 thereto and has an axial, reduced bore or inlet orifice 20 at its inner end surrounded by an annular valve seat 21 which extends inwardly into said chamber (Fig. 3). The conductor 15 is attached to the lateral outlet 18 of the regulator body 16 by a suitable fitting 22. A pair of radial, diametrically-opposed ports or openings 23 are provided in the intermediate portion of the body at substantially right angular and preferably coplanar relationship to its outlet, and include external, annular bosses or collars 24. The ports 23 are of relatively large diameter and are screw-threaded for detachable engagement by a pair of opposed diaphragm cases or pressure-responsive members 25 which will be described hereinafter.

An axial nipple 26 is formed in the end of the chamber 17 opposite the bushing 19 and is made integral with and supported by the wall of the body 16 with a small portion projecting outwardly from the end of said body, as shown most clearly in Figs. 3 and 7. The nipple includes a reduced inner end portion 27, having a screw-threaded bore 28, and a communicating counterbore 29 in its outward portion. A tubular plug 30, having an enlarged, external cap or head 31, is screw-threaded in the bore 28 and extends inwardly therefrom into the chamber 17 with its cap disposed within the counterbore 29. For sealing off between the plug and counterbore, an external, radial groove or recess 32 is formed in said plug adjacent its cap for snugly receiving an O-ring 33. In order to resist rotation of the plug 30 so as to hold the same in adjusted positions, the cross-sectional diameter of the O-ring is sufficiently greater than the depth of the groove to provide distortion of said O-ring in excess of that required for sealing engagement with the counterbore 29 (Fig. 5). The cap 31 has the usual screw driver slot 34 in its outer surface.

The plug coacts with the nipple 26 to provide an adjustable mounting for one end of a spring-pressed valve 35 mounted in the chamber 17 for coaction with the valve seat 21 and including a helical spring 36 and follower 37 confined within the bore of said plug by an annular retainer 38. As shown in Fig. 3, the follower 37 is in the form of a flanged cup and has an axial socket 39 for receiving one end of a valve stem 40 which extends axially of the chamber. An annular valve disk or element 41, of synthetic rubber, plastic or other suitable material, is carried by the opposite end of the valve stem for engagement with the valve seat and is mounted on a retainer block or member 42. Although the valve disk may be attached to the block in any suitable manner, preferably, a substantially conical boss or button 43 protrudes axially from the outer end of said block and has said disk confined thereupon. The block 42 is essentially rectangular or square in cross-section and has an axial socket 44, which may extend into the boss, for receiving one end of the valve stem 40. Due to this arrangement, the valve disk 41 is held in engagement with the seat 21 by the spring 36 and the pressure differentials for opening and closing the valve 35 may be varied by adjustment of the plug 30 which controls the compression of said spring. Upon opening of the valve, the gas flows from the conductor 13, through the orifice 20, chamber 17 and outlet 18 to the conductor 15 and carburetor 14.

As shown most clearly in Fig. 6, a screw-threaded, coaxial counterbore 45 is provided inwardly of the socket 44 and is intersected by a relatively deep recess or slot 46 extending transversely through the inner portion of the retainer block and having a width slightly less than the diameter of the counterbore, whereby the major portion of said counterbore is cut away and said block is substantially U-shaped. The counterbore is engaged by a tubular bolt member 47 extending inwardly of the block and having a polygonal head or nut portion 48 at its inward end, an axial bore 49 at its outward end and a coaxial counterbore 50 at its inward portion. An axial boss or nipple 51 projects from the outward end of the bolt member for engagement within a coaxial counterbore 52 at the inward portion of the socket 44 of the block, and a snap ring 53 carried by the valve stem 40 may engage the nipple for confining said stem in said socket.

The block 42 and its bolt member 47 coact to support and confine one of the ends of a pair of spaced, flat spring arms or resilient elements 54 which extend longitudinally of the chamber 17 in overlying relation to the ports 23. Although the spring elements may be separate, preferably, the same form the parallel arms of a resilient yoke or U-shaped spring 55 which has its base or cross bar 56 disposed within the slot 46 of the retainer block. An opening 57 is formed in the medial portion of the yoke base 56 to accommodate the nipple 51, and a transverse brace 58 overlies said yoke base for engagement by the bolt member. The brace is in the form of a flat, rigid bar of a length substantially equal to the length of the yoke base and having inwardly-directed, right-angular end portions 51 bearing against the ends of the spring arms 54. As shown by the numeral 60, the extremities of the end portions 59 are bent inwardly upon themselves in substantial alinement with each other and parallel relation to the bar or brace 58, which has a medial opening 61 for the nipple 51. It is noted that the yoke base and transverse brace are confined within the slot 46 by the clamping engagement of the bolt member 47 screw-threaded in the counterbore 45 and that said brace maintains the arms of the resilient yoke 55 in right angular relation to said base and in parallel relation to the valve stem 40 and each other. Of course, the spring arms 54 are free to flex and the corners of the brace between its bar, end portions and extremities are bevelled or rounded in the usual manner to permit such movement without crimping said spring arms.

The opposite or free ends of the spring arms are confined within longitudinal openings or slots 62 formed in opposed relation in the opposite end of the body 16 between its bore 17 and nipple 26 (Figs. 3 and 7). A pair of diametrically-opposed bosses or collars 63 are provided on this end portion of the body and have screw-threaded bores 64 communicating with the slots 62 for receiving plugs 65. The latter are tubular and include screw driver slotted caps or heads 66 at their outer ends for confining cylindrical pins or elements 67 in clamping engagement with the ends of the spring arms. Preferably, the clamp pins 67 are formed of suitable plastic or other material having a low coefficient of friction whereby the engagement of said pins with the spring arms can be tightened without tending to twist said arms. Due to the mounting of the spring arms, it is manifest that the same must undergo flexing movement upon opening of the valve 35 and that said spring arms coact with the spring 36 in resisting opening of said valve. The long length of the spring arms assures smooth opening and closing movement of the valve and eliminates fixed pivot points which are subject to wear and failure. It is noted that the arms may be formed of relatively inexpensive spring steel and that the same are readily replaceable.

Each diaphragm case 25 is circular and includes an inner section or back 68 and an outer section or front 69, both of which are circular and dished in the usual manner and have peripheral flanges 70 and 71, respectively (Figs. 3 and 4). One of the flanges is angular and bent over the other flange to connect the back and front of the case and for clamping the margin of a diaphragm 72 therebetween. Openings 73 are formed at the axis and adjacent the periphery of the case front 71 whereby the outer surface of the diaphragm 72 is exposed to atmospheric pressure. The case back 70 has an enlarged, axial boss or nipple 74 protruding therefrom for screw-threaded engagement with one of the ports 23 so as to detachably fasten the diaphragm case 25 to the body 16. An angular, annular flange 75 is formed within the inward end of the nipple and has a plurality of openings 76 extending axially of said nipple for establishing communication with the chamber 17 and exposing the inner surface of the diaphragm to the pressure of the fluid in said chamber. The flange extends radially of the nipple 74 in close proximity and parallel relation to the spring arm 54 which overlies the inner end of the port 23. As shown by the numeral 77, the flange 75 includes an internal, axial collar which extends toward the diaphragm 72 and which provides an outwardly-flaring orifice for guiding an axial, cylindrical element or plunger 78 carried by and projecting inwardly from said diaphragm.

A rounded end 79 is formed on the inward or free end of the plunger for engagement with the adjacent spring arm to transmit the inward movement of the diaphragm to said spring arm. Although mountable in any suitable manner, the plunger 78 has a reduced outward end 80 extending through the diaphragm and clampingly engaged by a conventional frictional fastener 81. In order to reduce frictional engagement of the plunger with the orifice 77 and with the spring arm to a minimum, said plunger is formed of suitable plastic or other material having a low coefficient of friction. A circular plate 82, of reinforced phenolic resin or other suitable light-weight material, is confined upon the reduced end 80 of the plunger between the diaphragm and the shoulder formed by said reduced end for reinforcing said diaphragm and its connection with said plunger. Preferably, the case front 69 has a circular boss 83 surrounding its axial opening 73 to accommodate the reduced outward end of the plunger and its fastener 81 upon outward movement of the diaphragm.

It is readily apparent that inward flexing of the diaphragms 72 cause inward flexing of the spring arms 54 due to the engagement of the plungers 78 with said spring arms and that such movement assists opening of the valve 35 by the pressure of the fluid in the conductor 13 exerted against the valve disk 41. When the pressure in the chamber 17 falls below a predetermined amount, the atmospheric pressure exerted against the outer surfaces of the diaphragms offsets the force of the helical spring 36 to assist the pressure fluid in the inlet conductor in unseating the valve by flexing said diaphragms inwardly. Since the diaphragms are mounted in opposed relation, the forces of said diaphragms are balanced and no lateral thrust or strain is imposed on the valve 35. As has been explained, the diaphragm cases 25 are readily removable for replacement and the inexpensive construction of said cases makes such replacement more economical than the replacement of the diaphragms. Also, the resilient yoke or spring 55 as well as the valve disk 41 and other elements of the valve including the spring 36 are readily replaceable whenever desired or necessary.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pressure regulator including a tubular body having a longitudinal bore, a pressure fluid inlet at one end of the bore, a pressure fluid outlet intermediate the ends of said bore, a valve controlling the flow of fluid through said bore from the inlet to the outlet, the valve including an inwardly-directed valve seat adjacent said inlet and a valve element adapted to engage the valve seat and having a surface exposed to the pressure of the fluid in said inlet, a valve stem having connection with the valve element and extending longitudinally of said bore, a helical spring mounted in the end of said bore opposite said inlet and having connection with the valve stem for holding said valve element engaged with said valve seat, the body having a pair of diametrically-opposed radial ports communicating with the intermediate portion of its bore adjacent said outlet for detachable connection with removable pressure-responsive members, each pressure-responsive member having its inner side exposed to the pressure within said bore and its outer side exposed to a substantially constant pressure, a U-shaped spring coacting with the helical spring and having flat arms extending longitudinally within said bore in contiguous overlying relation to the ports with the ends of the arms being secured to said body adjacent the end of said bore opposite said inlet, the base portion of the U-shaped spring having connection with said valve stem adjacent said valve element, and a thrust element extending between each spring arm and pressure-responsive member through each port for flexing the spring arm inwardly toward said valve stem to offset the force of said helical spring and to assist the pressure fluid in unseating said valve element when the pressure in said bore falls below a predetermined amount.

2. A pressure regulator as set forth in claim 1 including a member in the bore of the body carrying the valve element and having connection with the valve stem, and means fastened to the member for securing the base portion of the U-shaped spring thereto.

3. A pressure regulator as set forth in claim 2 wherein the secured arms of the U-shaped spring include means detachably fastening the ends of said spring arms in the bore of the body opposite its pressure fluid inlet, and means removably closing the inlet end of said bore and having an axial orifice surrounded by the valve seat whereby the U-shaped spring, valve element and carrying member may be inserted in and withdrawn from said bore through its inlet end.

4. A pressure regulator including a tubular body having a longitudinal bore, a pressure fluid inlet at one end of the bore, a pressure fluid outlet intermediate the ends of said bore, a valve controlling the flow of fluid through said bore from the inlet to the outlet, the valve including an inwardly-directed valve seat adjacent said inlet and a valve element adapted to engage the valve seat and having a surface exposed to the pressure of the fluid in said inlet, a valve stem having connection with the valve element and extending longitudinally of said bore, a helical spring mounted in the end of said bore opposite said inlet and having connection with the valve stem for holding said valve element engaged with said valve seat, the body having a pair of diametrically-opposed radial ports communicating with the intermediate portion of its bore adjacent said outlet for detachable connection with removable pressure-responsive members, each pressure-responsive member having its inner side exposed to the pressure within said bore and its outer side exposed to a substantially constant pressure, a pair of flat springs coacting with the helical spring and extending longitudinally within said bore in contiguous overlying relation to the ports, each flat spring having one end secured to said body adjacent said opposite end of said bore and its other end having connection with said valve stem adjacent said valve element, and a thrust element extending between each flat spring and pressure-responsive member through each port for flexing the flat spring inwardly toward said valve stem to assist the pressure fluid in unseating said valve element when the pressure in the bore falls below a predetermined amount.

5. A pressure regulator as set forth in claim 4 wherein the body is substantially T-shaped with the pressure fluid outlet of its bore extending substantially perpendicular to the pressure fluid inlet and radial ports.

6. A pressure regulator as set forth in claim 4 wherein the secured flat springs include means detachably fastening their secured ends in the bore of the body opposite its pressure fluid inlet, and removable means closing the inlet end of said bore and having an axial orifice surrounded by the valve seat whereby the valve element and springs may be inserted in and withdrawn from said bore through its inlet end.

References Cited in the file of this patent

UNITED STATES PATENTS

| | | |
|---|---|---|
| 408,873 | Crozier | Aug. 13, 1889 |
| 571,346 | Dickerson | Nov. 17, 1896 |
| 1,802,136 | Carter | Apr. 21, 1931 |
| 2,693,820 | Jones | Nov. 9, 1954 |
| 2,736,331 | Seeler | Feb. 28, 1956 |
| 2,771,092 | Schenk | Nov. 20, 1956 |